US011985480B2

(12) United States Patent
Knudsen et al.

(10) Patent No.: US 11,985,480 B2
(45) Date of Patent: May 14, 2024

(54) HEARING DEVICE COMPRISING A SOUND PATH COMPONENT

(71) Applicant: GN Hearing A/S, Ballerup (DK)

(72) Inventors: Emil Holm Knudsen, Copenhagen (DK); Alexander Wildt Forrest, Copenhagen (DK)

(73) Assignee: GN HEARING 2 A/S, Ballerup (DK)

( * ) Notice: Subject to any disclaimer, the term of this patent is extended or adjusted under 35 U.S.C. 154(b) by 0 days.

(21) Appl. No.: 17/719,298

(22) Filed: Apr. 12, 2022

(65) Prior Publication Data

US 2022/0386041 A1 Dec. 1, 2022

(30) Foreign Application Priority Data

May 28, 2021 (DK) .......................... PA 2021 70278

(51) Int. Cl.
*H04R 25/00* (2006.01)

(52) U.S. Cl.
CPC ........... *H04R 25/48* (2013.01); *H04R 25/604* (2013.01); *H04R 2460/11* (2013.01)

(58) Field of Classification Search
CPC .... H04R 25/48; H04R 25/604; H04R 25/456; H04R 2460/11
See application file for complete search history.

(56) References Cited

U.S. PATENT DOCUMENTS 5,033,090 A * 7/1991 Weinrich ............. H04R 25/453 381/318
2008/0232621 A1* 9/2008 Burns .................. H04R 25/456 381/318
2016/0105752 A1 4/2016 Van Halteren
2019/0215620 A1* 7/2019 Albahri ................ H04R 25/554
2019/0230448 A1* 7/2019 Sjursen ................ H04R 25/604
2020/0196074 A1* 6/2020 Tiefenau .............. H04R 25/456
(Continued)

FOREIGN PATENT DOCUMENTS

DE 112006000463 2/2012
EP 1973381 9/2008
(Continued)

OTHER PUBLICATIONS

Foreign OA dated Nov. 30, 2021 for DK app 2021 70278.
(Continued)

*Primary Examiner* — Suhan Ni
(74) *Attorney, Agent, or Firm* — Vista IP Law Group, LLP

(57) ABSTRACT

A hearing device includes a sound path component having: a chamber at a first end of the hearing device; a vent channel extending from the chamber to a second end of the hearing device, the vent channel having a first vent end at the chamber and a second vent end; an output transducer opening configured to couple to an output transducer; a first opening at the chamber and being configured to face towards an ear canal of the user; and a second opening at the second end of the hearing device and being configured to face towards a surrounding, the second opening being at the second vent end of the vent channel; and an input transducer opening configured to couple to a first input transducer; the vent channel, the input transducer opening, the output transducer opening, the first opening and the second opening being in fluid connection with each another.

15 Claims, 5 Drawing Sheets

(56) References Cited

U.S. PATENT DOCUMENTS

| | | | | |
|---|---|---|---|---|
| 2020/0260197 | A1* | 8/2020 | Thomsen | H04R 25/48 |
| 2022/0014849 | A1 | 1/2022 | Christiansen | |
| 2022/0174431 | A1* | 6/2022 | Johansen | H04R 25/656 |

FOREIGN PATENT DOCUMENTS

| | | |
|---|---|---|
| EP | 3672279 | 6/2020 |
| WO | WO 2017/106325 | 6/2017 |
| WO | WO 2020/153666 | 7/2020 |

OTHER PUBLICATIONS

Foreign Search report for DK app 2021 70278 dated Nov. 30, 2021.

Extended European Search Report for EP Patent Appln. No. 22172085.7 dated Oct. 21, 2022.

* cited by examiner

HEARING DEVICE COMPRISING A SOUND PATH COMPONENT

RELATED APPLICATION DATA

This application claims priority to, and the benefit of, Danish Patent Application No. PA 2021 70278 filed on May 28, 2021. The entire disclosure of the above application is expressly incorporated by reference herein.

FIELD

The present disclosure relates to hearing devices. More specifically, the disclosure relates to a hearing device configured to be arranged in an ear of a user wherein the hearing device comprises a sound path component.

BACKGROUND

A hearing device is an electronic device adapted for providing sound to, or alleviating a hearing loss of a person. The hearing devices typically comprise a plurality of paths for e.g. guiding the sound within the hearing device. For example, the hearing device may comprise a sound path to transfer incoming sounds, received by a microphone, from the surroundings to an ear canal of a user. As another example, the hearing device may comprise another sound path i.e. a vent channel to equalize pressure between the ear canal and the surroundings.

However, the hearing devices comprising such paths may present several challenges such as design complexity and repair difficulty. Therefore, there is a need to provide an improved hearing device comprising such paths that may address or at least mitigate such challenges.

SUMMARY

It is an object of embodiments to provide an improved hearing device comprising a sound path system that is simple, cheap, compact and air-tight.

It is another object of embodiments to provide an improved hearing device comprising a sound path system that is repair friendly and hence has a longer lifetime.

According to a first aspect, a hearing device is disclosed. The hearing device is configured to be arranged in an ear of a user. The hearing device comprises a sound path component. The sound path component comprises a chamber arranged at a first end of the hearing device. The sound path component further comprises a vent channel configured to vent the hearing device. The vent channel extends from the chamber to a second end of the hearing device. The vent channel has a first vent end at the chamber and a second vent end at the second end of the hearing device. The sound path component further comprises an output transducer opening configured to be connected to an output transducer. The output transducer opening is arranged at the chamber. The sound path component further comprises a first opening arranged at the chamber and being configured to point towards an ear canal of the user, when the user is wearing the hearing device in its intended position in the ear. The sound path component further comprises a second opening arranged at the second end of the hearing device and being configured to point towards surrounding of the user, when the user is wearing the hearing device in its intended position in the ear. The second opening is at the second vent end of the vent channel. The chamber, the vent channel, the output transducer opening, the first opening and the second opening are in fluid connection with one another.

Thereby, the vent channel, the first opening, the second opening and the output transducer opening of the sound path system are connected to the chamber i.e. a common chamber. This in turn allows for a simple, cheap, user-friendly, and compact sound path component, as the sound path component comprises a common chamber instead of separate chambers. In addition, the vent channel, the output transducer opening, the first opening and the second opening are in fluid connection with one another via the chamber. Thereby, an air-tight sound path component is achieved, as the sound path component comprises openings where relevant such that the sound may not leak. The air-tight sound path component also allows for at least an improved sealing, compared to the sound path components with e.g. separate chambers. This is because the common chamber at least reduces the sound leakage due to less number of parts i.e. less leakage paths, compared to separate chambers. The output transducer opening may have a diameter of e.g. 1.4 mm.

The vent channel aims to address the occlusion effect. The occlusion effect occurs when some object, like an unvented earmold, completely fills the outer portion of the ear canal. This traps the bone-conducted sound vibrations of the person's own voice when speaking and movement/vibration induced sound from walking, running, chewing, etc. in the space between the tip of the earmold and the eardrum. Normally, when people talk or chew these vibrations escape through an open ear canal and the person is unaware of these sound vibrations. But when the ear canal is blocked e.g. by an earmold, the vibrations are reflected back toward the eardrum and increases the loudness perception of the person's own voice or movements. Compared to a completely open ear canal, the occlusion effect may boost the low frequency (usually below 500 Hz) sound pressure in the ear canal by 20 dB or more. Some people wearing hearing devices, such as hearing aids, have a large occlusion effect, and these people may find that their own voice sounds disturbing, and they may also feel a sense of pressure or blockage in the ear when an earmold of a hearing device is inserted in the ear. The vent channel is configured to vent the hearing device. The vent channel removes or at least mitigates the occlusion effect. The vent channel allows for pressure equalization between the ear canal and the surroundings. The vent channel may be 2 mm long along a longitudinal direction of the hearing device. The vent channel may have a diameter of 0.8 mm e.g. along a transversal direction of the hearing device.

The hearing device may comprise a dome. The dome may be attached to a housing of the hearing device for providing the sound in the ear canal of the user.

The hearing device may also comprise active occlusion cancellation to remove or to further reduce the occlusion effect for the user the hearing device.

Active occlusion cancellation is a method for reducing unwanted sound by the addition of a second sound specifically designed to cancel the first. This may also be used in active noise control (ANC), also known as noise cancellation, or active noise reduction (ANR).

Sound is a pressure wave, which consists of alternating periods of compression and rarefaction. An output transducer (e.g. a receiver or speaker) in an earpiece performing active occlusion cancellation emits a sound wave with the same amplitude but with inverted phase (also known as antiphase) to the original sound. The waves combine to form a new wave, in a process called interference, and effectively cancel each other out—an effect that is called destructive interference.

Active occlusion cancellation may be achieved through the use of analog circuits or digital signal processing. Adaptive algorithms are designed to analyze the waveform of the original sound, i.e. the sound received in an input transducer in the ear (e.g. an ear canal microphone and/or a bone conduction unit), and then based on the specific algorithm generate a signal of equal amplitude with either shifted phase or inverting the polarity of the original signal. This inverted signal (in antiphase) may then be amplified and the output transducer in the ear creates a sound wave directly proportional to the amplitude of the original waveform, creating destructive interference. This effectively reduces the volume of the perceivable occlusion effect. The output transducer emitting the cancellation signal may be located at the location where sound attenuation is wanted, i.e. in the users ear.

By the sound path component is hereby meant a component that allows the sound to pass through it. Thus, the sound path component comprises a path where the sound can pass. The sound path component may be a closed or partly closed compartment which is configured to confine and direct the sound in a fixed manner. The walls of the sound path component may be air-tight and impermeable to sound and air. Thus, the sound path component may provide that sound is directed to and/or from the first end of the hearing device and the second end of the hearing device. Sound may not escape the sound path component except at the first end and the second end of the hearing device.

By the first end of the hearing device is hereby meant an end of the hearing device that is configured to point towards an ear canal of the user when the user is wearing the hearing device in its intended position in the ear.

By the second end of the hearing device is hereby meant another end of the hearing device that is configured to point towards surrounding of the user, when the user is wearing the hearing device in its intended position in the ear. The second end may be an opposite end with respect to the first end. The second end may not be an opposite end with respect to the first end. The second end may be arranged on a side of the hearing device.

The chamber may be a partly closed compartment which is configured to confine and direct the sound in a fixed manner. The walls of the chamber may be air-tight and impermeable to sound and air. Thus, the chamber may provide that sound is directed to and/or from the first end of the hearing device and the second end of the hearing device.

By being arranged at the chamber is hereby meant that being arranged at a vicinity of the chamber, in the chamber, adjacent the chamber, e.g. at an upper side of the chamber, a lower side of the chamber, or a side of the chamber. The upper side of the chamber may be a side which may point towards the ear canal of the user, when the user is wearing the hearing device in its intended position in the ear. The lower side of the chamber may be a side which may point towards opposite of the ear canal of the user, when the user is wearing the hearing device in its intended position in the ear. The side of the chamber may be arranged e.g. in between the upper side and the lower side of the chamber.

The sound path component comprises an output transducer opening configured to be connected to an output transducer. The output transducer opening is arranged at the chamber. The output transducer opening may be an opening, an passage, a hole, a through hole, and/or a connection point between the chamber and an output transducer. The output transducer opening may have a circular shape. The output transducer opening may have a diameter of e.g. 1.4 mm. The output transducer opening may have any other shapes.

The sound path component comprises a first opening arranged at the chamber. The first opening may be an opening, a passage, a hole, a through hole, and/or a connection point between the chamber and the first end of the hearing device, such as to an ear canal of the user, when the user is wearing the hearing device in its intended position in the ear. The first opening may have a circular shape. The first opening may have a diameter of e.g. 3 mm. The first opening may have any other shapes. A shell may be arranged around the first opening of the sound path component. The shell may be a part of the hearing device wherein the dome is mounted thereon. For instance, the shell may be a portion or a part of the housing of the hearing device. The dome may be mounted onto the shell of the hearing device. A nozzle insert may be arranged inside the shell. The nozzle insert may be used to make the connection from the sound path component to the ear of the user. The nozzle insert may facilitate using a radial first sealing unit and/or a radial second sealing unit. The nozzle insert may facilitate cleaning of the hearing device. The nozzle insert may collect e.g. the ear wax and may have an exchangeable filter part to be exchanged when desired. The nozzle insert may have different configurations.

The sound path component further comprises a second opening arranged at the second end of the hearing device. The second opening may be an opening, a passage, a hole, a through hole, and/or a connection point between the sound path compartment and the second end of the hearing device, such as to the surroundings, when the user is wearing the hearing device in its intended position in the ear. The second opening may have a circular shape. The second opening may have a diameter of e.g. 0.8 mm or 2 mm. The diameter of the second opening may depend on the length of the sound path component and frequencies that are desired to be filtered out. The second opening may have any other shapes.

The hearing device may be a headset, a hearing aid, a hearable etc. The hearing device may be an in-the-ear (ITE) hearing device, a receiver-in-ear (RIE) hearing device, a receiver-in-canal (RIC) hearing device, a microphone-and-receiver-in-ear (MaRIE) hearing device, a behind-the-ear (BTE) hearing device comprising an ITE unit, or a one-size-fits-all hearing device etc.

The hearing device is configured to be worn by a user. The hearing device may be arranged at the user's ear, on the user's ear, in the user's ear, in the user's ear canal, behind the user's ear etc. The user may wear two hearing devices, one hearing device at each ear. The two hearing devices may be connected, such as wirelessly connected.

The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc.

The hearing device may comprise a housing. The housing may comprise a push button for controlling one or more functionalities of the hearing device. The push button may be in its designed position, neutral position or starting position, which is the position when the push button is not activated, e.g. by a user. When the push button is pushed by the user, the user can push the push button all the way down to its depressed position.

The push button may be arranged on or in the housing.

The push button may be provided on a first surface of the housing. The first surface may be configured to point towards the surroundings when the hearing device is arranged at the user's ear in its intended position. The first surface may be on the exterior of the housing.

An air gap may be provided between the push button and the housing in the first surface of the housing. The air gap may at least partly be defined by an opening in the housing, where the push button is arranged. The air gap may have a shape which at least partly corresponds to the shape of the push button. The push button may be circular, and the air gap may be ring-shaped, e.g. around the shape of the push button.

The housing of the hearing device may at least be partly a closed entity comprising one or more electronic components of the hearing device. The housing may comprise an exterior surface, which may be in contact with the user's skin. The housing may comprise an interior space where the electronic components are arranged therein. The hearing device may comprise a printed circuit board (PCB), and an electrical contact may be arranged on the PCB for providing an electrical connection to the push button for controlling the one or more functionalities of the hearing device. The electrical contact may be arranged on the PCB for providing the electrical connection to the push button for controlling the one or more functionalities of the hearing device, when the push button is activated by pushing it down into its depressed position. A protrusion on the push button may be provided to touch the electrical contact.

The hearing device may comprise a RIE unit. The RIE unit typically comprises the earpiece such as a housing, a plug connector, and an electrical wire/tube connecting the plug connector and earpiece. The earpiece may comprise an in-the-ear housing, a receiver, such as a receiver configured for being provided in an ear of a user, and a closed dome. The dome may support correct placement of the earpiece in the ear of the user. The RIE unit may comprise an input transducer e.g. a microphone or a receiver, an output transducer e.g. an speaker, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

The hearing device may comprise an output transducer e.g. a speaker or receiver. The output transducer may be a part of a printed circuit board (PCB) of the hearing device. The output transducer may be arranged on a printed circuit board (PCB) of the hearing device. The output transducer may not be a part of the PCB of the hearing device. The output transducer may be configured to be arranged on the PCB of the hearing device. For instance, the output transducer may be configured to be arranged on an allocated position/area on the PCB of the hearing device. The output transducer may be arranged through a hole in the PCB.

The hearing device may comprise a first input transducer, e.g. a microphone, to generate one or more microphone output signals based on a received audio signal. The audio signal may be an analogue signal. The microphone output signal may be a digital signal. Thus, the first input transducer, e.g. microphone, or an analogue-to-digital converter, may convert the analogue audio signal into a digital microphone output signal. All the signals may be sound signals or signals comprising information about sound.

The hearing device may comprise a signal processor. The one or more microphone output signals may be provided to the signal processor for processing the one or more microphone output signals. The signals may be processed such as to compensate for a user's hearing loss or hearing impairment. The signal processor may provide a modified signal. All these components may be comprised in a housing of an ITE unit or a BTE unit. The hearing device may comprise a receiver or output transducer or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in an ITE unit or in an earpiece, e.g. RIE unit or MaRIE unit. The hearing device may comprise more than one microphone, and the ITE unit or BTE unit may comprise at least one microphone and the RIE unit may also comprise at least one microphone.

The hearing device signal processor may comprise elements such as an amplifier, a compressor and/or a noise reduction system etc. The signal processor may be implemented in a signal-processing chip or on the PCB of the hearing device. The hearing device may further have a filter function, such as compensation filter for optimizing the output signal.

The hearing device may furthermore comprise a wireless communication unit or chip, such as a wireless communication circuit or a magnetic induction chip, for wireless data communication interconnected with an antenna, such as an radio frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

In some embodiments, the sound path component may further comprise an input transducer opening configured to be connected to a first input transducer. The input transducer opening may be arranged at the chamber. The input transducer opening may be in fluid connection with the chamber, the vent channel, the output transducer opening, the first opening and the second opening.

Thereby, the input transducer opening may also be connected to the chamber i.e. the common chamber. Hence, the input transducer opening may be be in fluid connection with the vent channel, the first opening, second opening and the output transducer opening of the sound path system via the common chamber. This in turn may allow for even simpler, cheaper, more user-friendly, more compact and an improved air-tight sound path component. In addition, the improved air-tight sound path system may allow for an even more improved sealing, compared to the sound path components having separate chambers. The input transducer opening may have a diameter of e.g. 1.4 mm.

Thus, the sound path component may comprise an input transducer opening configured to be connected to an input transducer. The input transducer opening may be arranged at the chamber. The input transducer opening may be an opening, an passage, a hole, a through hole, and/or a connection point between the chamber and an input transducer. The input transducer opening may have a circular shape. The input transducer opening may have a diameter of e.g. 1.4 mm. The input transducer opening may have any other shapes.

The input transducer may be the input transducer configured for active occlusion cancellation. The input transducer opening may be arranged at the chamber e.g. an upper side of the chamber, a lower side of the chamber, or a side of the chamber. The hearing device may comprise other input transducers. The other input transducers may be configured to point towards surrounding of the user, when the user is wearing the hearing device in its intended position in the ear. For instance, the other input transducers may be arranged at the second end of the hearing device. The other input transducers may record sound from the surrounding to amplify. Such recorded sound may be reproduced acoustically by e.g. a small loudspeaker in the hearing device, thereby e.g. alleviating a hearing loss of the person in such a way that frequencies hard to perceive by the person may be amplified to a level above the person's hearing threshold at those frequencies.

In some embodiments, the chamber may have a number of sides. The output transducer opening may be arranged at a first side of the chamber. The input transducer opening may be arranged at a second side of the chamber. This may in turn allow for a flexible sound path component e.g. the sound path component may be designed in a flexible manner. The chamber may have a number of sides such as two sides, three sides, four sides, etc. The sides may be walls of the chamber. The first side of the chamber may be an upper side of the chamber, a lower side of the chamber or a side perpendicular to the upper and/or lower side of the chamber. The second side of the chamber may also be an upper side of the chamber, a lower side of the chamber or a side perpendicular to the upper and/or lower side of the chamber, different from the first side of the chamber. The first side and the second side of the chamber may be arranged opposite to each other. The first side and the second side of the chamber need not be arranged opposite to each other. The first side of the chamber may be arranged with an angle, with respect to the second side of the chamber i.e. a a normal plane of the first side of the chamber may be arranged with an angle with respect to a normal plane of the second side of the chamber. Such angle may be any angle such as 90 degree.

In some embodiment, the chamber may have a number of sides, and wherein the output transducer opening and the input transducer opening are arranged at a first side of the chamber. Thereby, both the input transducer and the output transducer may be arranged on the same side of the chamber. This may in turn allow for a more flexible sound path component e.g. the sound path component may be designed in a more flexible manner.

In some embodiments, the sound path component may be a one-part component. In other words, the sound path component may be made of one part. Thereby, the sound path component may be provided in a simpler manner. For instance, the sound path component may be manufactured by molding. Thereby, the one-part sound path component may facilitate such molding e.g. may allow for an improved molding e.g. easier, cheaper and faster molding.

Alternatively, the sound path component may not be a one-part component. For instance, the sound path component may be a two-part component or may be a multi-component.

In some embodiments, the sound path component may be replacable in the hearing device. This may in turn allow for increasing the life time of the hearing device by replacing the sound path component when needed. In the case of the one-part sound path component, the replaceability of the sound path component may allow for an improved maintenance, repair or change of the sound path component. This is because only the one-part sound path component may need to be e.g. changed, compared to the sound path components which comprise several parts.

In some embodiments, at least a portion of the sound path component may be made of a flexible material. The flexible material may e.g. be a soft material. This may in turn allow for a more compact hearing device since the sound path component may e.g. be bend to be fitted into a housing of the hearing device. For instance, the vent channel may be made of a flexible material. In addition, the flexible material may allow for a flexible installation of the sound path component, as the sound path component may conveniently be fitted into the housing of the hearing device. Examples of the flexible material e.g. the soft material may comprise silicon or Thermoplastic Elastomer (TPE). Alternatively, the sound path component may be made of a flexible e.g. a soft material and a non-flexible material e.g. a hard material. Examples of the non-flexible material e.g. the hard material may comprise hard plastics such as ABS.

In some embodiments, the hearing device may comprise a first sealing unit for the output transducer opening and a second sealing unit for the input transducer opening. The first sealing unit and the second sealing unit may be configured to respectively seal the output transducer opening and the input transducer opening. Thereby, the first sealing unit and the second sealing unit may provide an improved sealing of the sound path component i.e. the first sealing unit and the second sealing unit may prevent or at least reduce sound leakage from the input transducer opening and the output transducer opening. The first sealing unit and/or the second sealing unit may be a radial sealing unit e.g. a ring sealing unit. Such radial sealing units may be radially flexible i.e. may radially seal the output transducer opening and the input transducer opening. In the case of the first sealing unit and/or the second sealing unit being a radial sealing unit(s), such radial sealing unit(s) may create some tension in the radial direction. The first sealing unit and/or the second sealing unit may be an axial sealing unit. Such axial sealing units may be axially flexible i.e. may axially seal the output transducer opening and the input transducer opening. In the case of the first sealing unit and/or the second sealing unit being an axial sealing unit(s), such axial sealing unit may act as a spring element creating some tension in the axial direction and hence facilitate e.g. closing of the hearing device. The first sealing unit and/or the second sealing unit may be made of e.g. Silicone.

In some embodiments, the hearing device may comprise a dome at the first opening. The hearing device may comprise a third sealing unit between the dome and the first opening. The third sealing unit may be a radial sealing unit or an axial sealing unit. The dome may be made of a resilient material which conforms to the ear canal during use. The dome may be lighter and more comfortable, compared to e.g. an ear plug. The dome may have a closed configuration. The closed configuration may provide the functionality of a closed ear plug without a vent.

In some embodiment, a dimension of the chamber along a first direction may be in the range of 2-10 mm. A dimension of the chamber along a second direction may be in the range of 2-10 mm. The chamber may comprise a shape of a ball with a diameter of e.g. 2.5 mm. The chamber may have a volume of 13 $mm^3$. The first direction may be a direction extending from the first end of the hearing device to the second end of the hearing device. The first direction may extend along the longitudinal direction of the hearing device. The second direction may be a direction extending opposite to the first direction. The second direction may extend along the transversal direction of the hearing device.

The present disclosure relates to different aspects including the hearing device and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
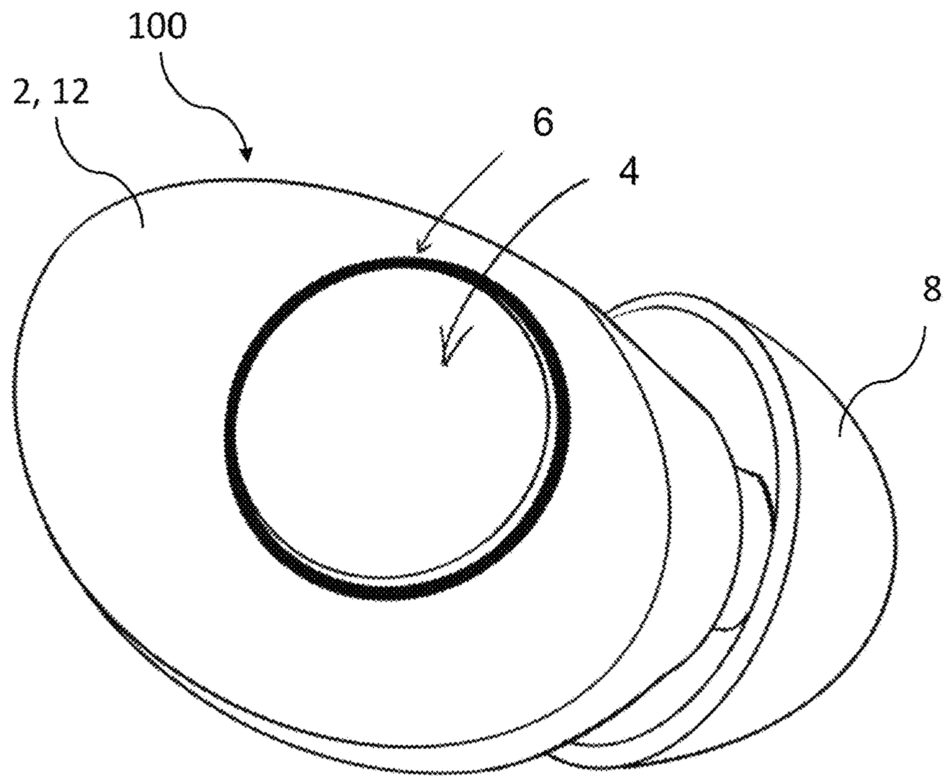
FIG. 1*a* schematically illustrates a perspective view of an example of a hearing device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 a schematically illustrates a perspective view of an example of a hearing device 100. The hearing device 100 is configured to be arranged in an ear of a user. FIG. 1*a* shows that the hearing device 100 comprises a housing 2. The housing 2 may comprise a push button 4 for controlling one or more functionalities of the hearing device 100. The push button 4, shown in FIG. 1*a* is shown in its designed position, neutral position or starting position, which is the position when the push button 4 is not activated, e.g. by a user. When the push button is pushed by the user, the user can push the push button all the way down to its depressed position. The push button 4 may be arranged on or in the housing 2.

The push button 4 may be provided on a first surface 12 of the housing 2. The first surface 12 is configured to point towards the surroundings when the hearing device 100 is arranged at the user's ear in its intended position. The first surface 12 may be on the exterior of the housing 2.

FIG. 1*a* also shows that an air gap 6 is provided between the push button 4 and the housing 2 in the first surface 12 of the housing 2. The air gap 6 may at least partly be defined by an opening in the housing 2, where the push button 4 is arranged. The air gap 6 may have a shape which at least partly corresponds to the shape of the push button 4. The push button 4 may be circular, and the air gap 6 may be ring-shaped, e.g. around the shape of the push button 4.

FIG. 1*a* also shows that the hearing device 100 comprises a dome 8. The dome 8 may be attached to the housing 2 for providing the sound in the ear canal of the user.

Figure 1B:
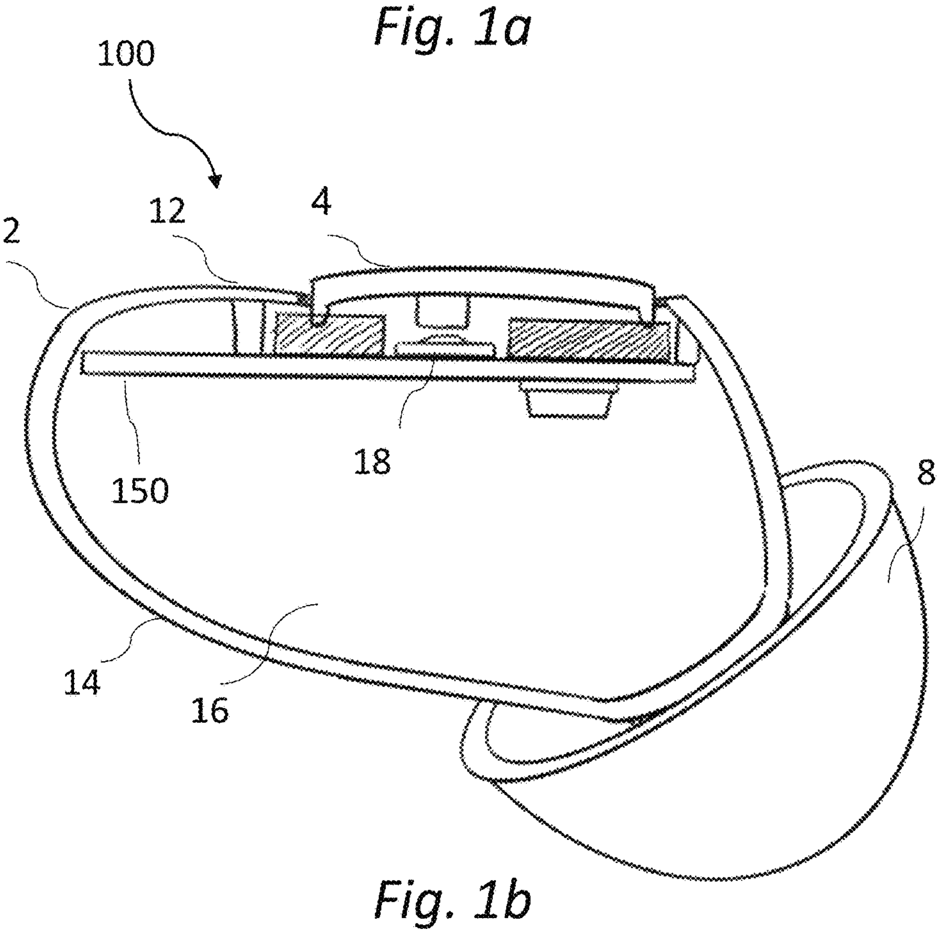
FIG. 1*b* schematically illustrates a cross-sectional view of an example of a hearing device.

FIG. 1*b* schematically illustrates a cross-sectional view of an example of a hearing device 100. FIG. 1*b* also shows the a cross-sectional view of the housing 2, the push button 4, the air gap 6 and the dome 8. The housing 2 of the hearing device 100 may at least partly be a closed entity comprising one or more electronic components of the hearing device 100. FIG. 1*b* shows that the housing 2 comprises an exterior surface 14, which may be in contact with the user's skin. The housing 2 may comprise an interior space 16 where the electronic components are arranged therein. FIG. 1*b* also shows that the hearing device 100 comprises a printed circuit board (PCB) 150, and an electrical contact 18 is arranged on the printed circuit board 150 for providing an electrical connection to the push button 4 for controlling the one or more functionalities of the hearing device 100. The electrical contact 18 may be arranged on the printed circuit board 150 for providing the electrical connection to the push button 4 for controlling the one or more functionalities of the hearing device 100, when the push button 4 is activated by pushing it down into its depressed position. A protrusion on the push button 4 may be provided to touch the electrical contact 18.

Figures 2A, 2B, 2C:
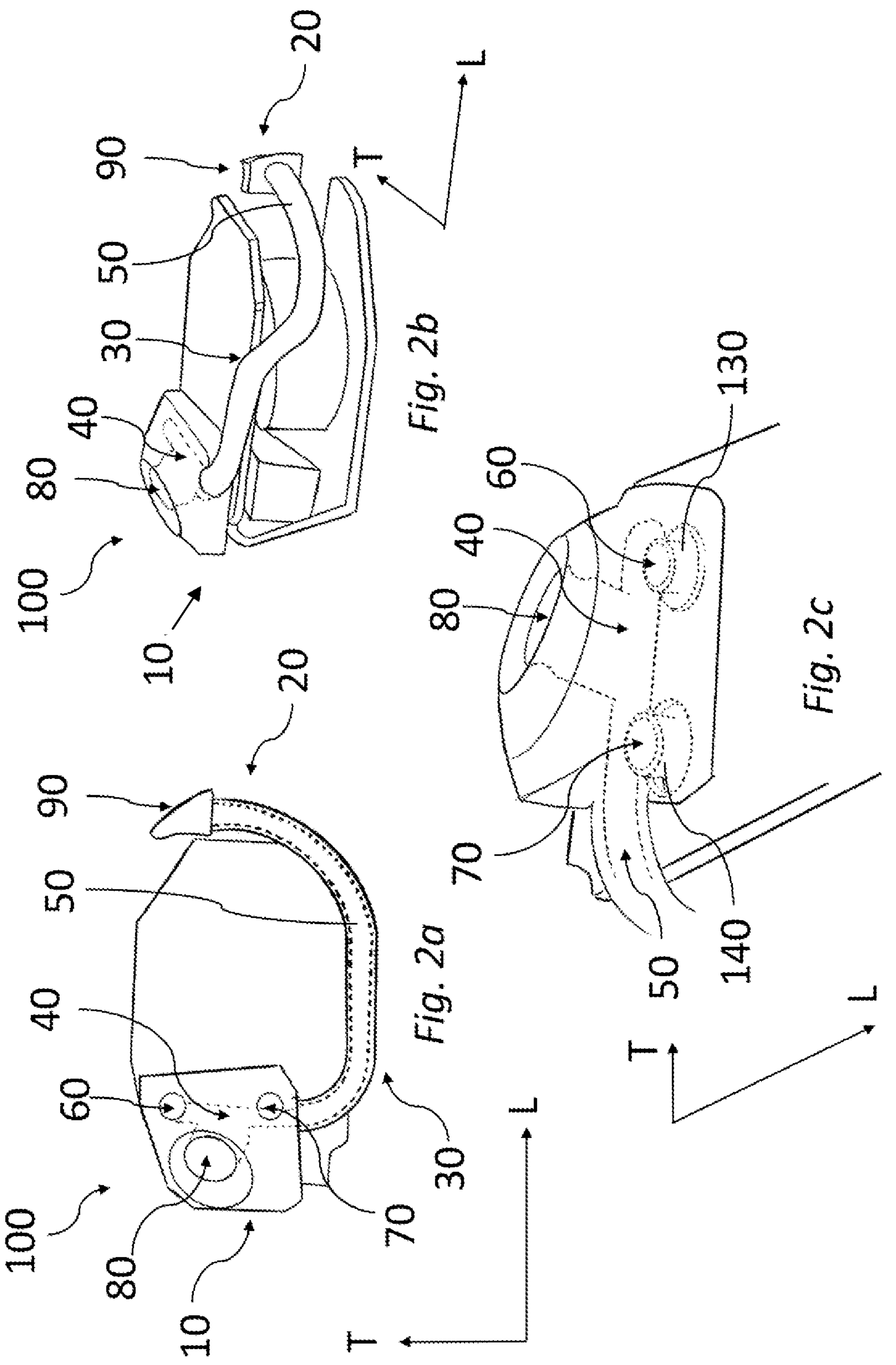
FIG. 2*a* schematically illustrates a top view of a part of a hearing device comprising a sound path component.
FIG. 2*b*, schematically illustrates a perspective longitudinal side view of the part of the hearing device comprising the sound path component, shown in FIG. 2*a;*
FIG. 2*c* schematically illustrates a magnified perspective transversal side view of the part of the hearing device comprising the sound path component, shown in FIG. 2*a*.

FIG. 2*a* schematically illustrates a top view of a part of a hearing device 100. FIG. 2*a* shows a first end of the hearing device 10 and a second end of the hearing device 20. In FIG. 2*a*, a direction L shows a first direction. FIG. 2*a* shows that the direction L extends from the first end 10 of the hearing device 100 to the second end 20 of the hearing device 100. FIG. 2*a* shows that the first direction extends along a longitudinal direction of the hearing device 100. In FIG. 2*a*, a direction T shows a second direction. FIG. 2*a* shows that the second direction extends opposite to the first direction. FIG. 2*a* shows that the second direction extends along a transversal direction of the hearing device 100.

FIG. 2*a* also shows that the hearing device 100 comprises a sound path component 30. The sound path component 30 comprises a chamber 40. The chamber 40 is arranged at a first end of the hearing device 10. The chamber 40 may have a number of sides. A dimension of the chamber 40 along a first direction i.e. the direction L may be in the range of 2-10 mm. A dimension of the chamber 40 along a second direction i.e. the direction T may be in the range of 2-10 mm.

FIG. 2*a* also shows that the sound path component 30 comprises a vent channel 50. The vent channel 50 is configured to vent the hearing device 100. The vent channel 50 extends from the chamber 40 to a second end of the hearing device 20. The vent channel 50 has a first vent end at the chamber 40. The vent channel 50 has a second vent end at the second end of the hearing device 20. A length of the vent channel 50 along the first direction, such as substantially along the first direction, i.e. the direction L may be 2 mm. A diameter of the vent channel 50 may be 0.8 mm. For instance, a diameter of the vent channel 50 along the direction T may be 0.8 mm.

In addition, FIG. 2*a* shows that the sound path component 30 comprises an output transducer opening 60. The output transducer opening 60 is configured to be connected to an output transducer 120. The output transducer opening 60 is arranged at the chamber 40. The output transducer opening 60 may have a circular shape. The output transducer opening 60 may have a diameter of e.g. 1.4 mm. The output transducer opening 60 may have any other shapes. FIG. 2*a* shows that the sound path component 30 comprises a first opening 80. The first opening 80 is arranged at the chamber 40. The first opening 80 is configured to point towards an ear canal of the user, when the user is wearing the hearing device 100 in its intended position in the ear. The first opening 80 may have a circular shape. The first opening 80 may have a diameter of e.g. 3 mm. The first opening 80 may have any other shapes. Furthermore, FIG. 2*a* shows that the sound path component 30 comprises a second opening 90. The second opening 90 is arranged at the second end of the hearing device 20. The second opening 90 is configured to point towards surrounding of the user, when the user is wearing the hearing device 100 in its intended position in the ear. The second opening 90 is at the second vent end of the vent channel 50. The second opening 90 may have a circular shape. The second opening 90 may have a diameter of e.g. 0.8 mm. The second opening 90 may have any other shapes.

FIG. 2*a* shows that the chamber 40, the vent channel 50, the output transducer opening 60, the first opening 80 and the second opening 90 are in fluid connection with one another.

In addition, FIG. 2*a* shows that the sound path component 30 comprises an input transducer opening 70. The input transducer opening 70 may be configured to be connected to a first input transducer 110. The input transducer opening 70 may be arranged at the chamber 40. The input transducer opening 70 may be in fluid connection with the chamber 40, the vent channel 50, the output transducer opening 60, the first opening 80 and the second opening 90. The input transducer opening 70 may have a circular shape. The input transducer opening 70 may have a diameter of e.g. 1.4 mm or larger. The input transducer opening 70 may have any other shapes.

FIG. 2*b* schematically illustrates a perspective longitudinal side view of the part of the hearing device 100 comprising the sound path component 30, shown in FIG. 2*a*. The reference signs shown in FIG. 2*b* at least partly correspond to those as shown in FIG. 2*a* and described above in connection with FIG. 2*a*. At least a portion of the sound path component 30 may be made of a flexible material e.g. a soft material. For instance, the vent channel 50 may be made of a flexible material. FIG. 2*b* shows that the vent channel 50 is bend to be fitted into the hearing device 100. For example, the vent channel 50 may be made of silicon or Thermoplastic Elastomer (TPE). In addition, the sound path component 30 may be a one-part component. The sound path component 30 may be made of one part. The sound path component 30 may be replacable in the hearing device 100.

FIG. 2*c* schematically illustrates a magnified perspective transversal side view of the part of the hearing device comprising the sound path component, shown in FIG. 2*a*. The reference signs shown in FIG. 2*c* at least partly correspond to those as shown in FIG. 2*a* and described above in connection with FIG. 2*a*. FIG. 2*c* shows that the hearing device 100 comprises a first sealing unit 130 for the output transducer opening 60. FIG. 2*c* also shows that the hearing device 100 comprises a second sealing unit 140 for the input transducer opening 70. The first sealing unit 130 and the second sealing unit 140 may be configured to respectively seal the output transducer opening 60 and the input transducer opening 70.

Figure 3:
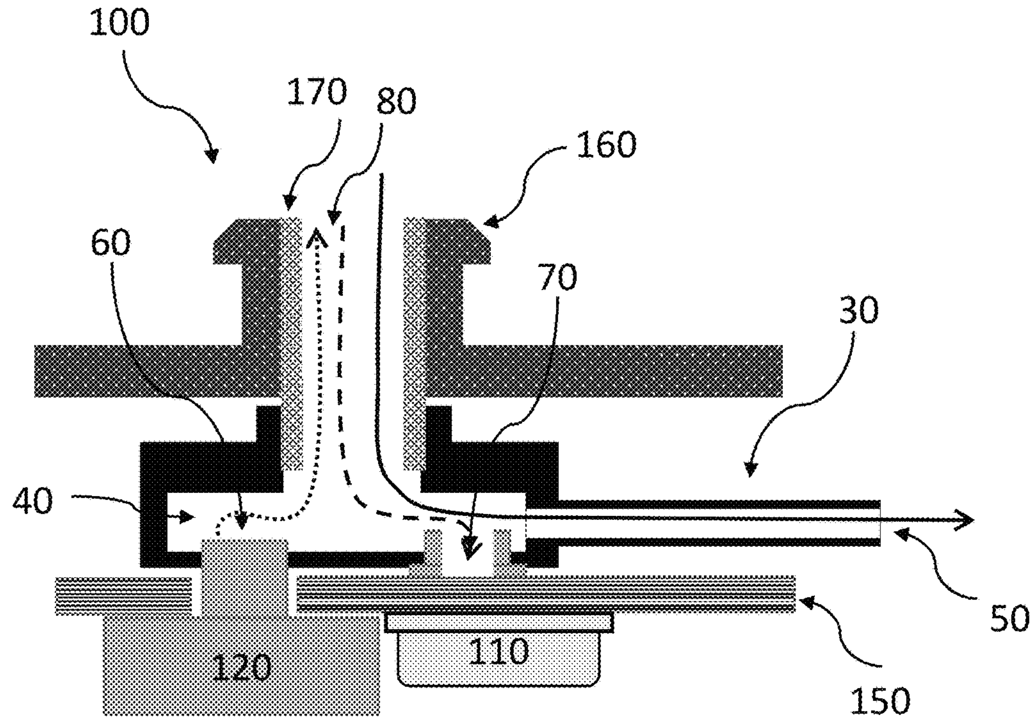
FIGS. 3-7 each schematically illustrates a cross-sectional side view of a cut through of a part of an exemplary hearing device comprising a sound path component.

FIGS. 3-7 each schematically illustrates a cross-sectional side view of a cut through of a part of an exemplary hearing device 100 comprising a sound path component 30. In FIGS. 3-7, the part of the hearing device 100 comprising the sound path component 30 may be cut in a direction perpendicular to the directions L and T shown in FIGS. 2*a*, 2*b* and 2*c*. FIG. 3 shows a part of an exemplary hearing device 100 comprising a sound path component 30. FIG. 3 also shows a printed circuit board (PCB) 150 arranged under the sound path component 30. FIG. 3 also shows an output transducer 120. The output transducer 120, shown in FIG. 3, is arranged on the PCB 150 through a hole on the PCB 150. FIG. 3 also shows an input transducer 110. The input transducer 110, shown in FIG. 3, is not a part of the PCB 150. FIG. 3 shows that the input transducer 110 is arranged on an allocated position/area on the PCB 150 of the hearing device 100. FIG. 3 also shows an output transducer opening 60 connected to the output transducer 120 and input transducer opening 70 connected to the input transducer 110. FIG. 3 also shows that the sound path component 30 comprises a chamber 40 and a vent channel 50. The chamber 40 of the sound path component 30 may have a number of sides. FIG. 3 shows that the output transducer opening 60 and the input transducer opening 70 are arranged at a first side of the chamber 40 i.e. at the same side of the chamber 40. In FIG. 3, the dotted line shows a path of sound going out from the output transducer 120. In FIG. 3, the dashed line shows a path of sound going into the input transducer 110. In FIG. 3, the solid line shows a path of sound travelling through the vent channel 50. FIG. 3 also shows a part of a shell 160 arranged around a first opening 80 of the sound path component 30. The shell 160 may be a part of the hearing device 100 where the dome 8 is mounted thereon. For instance, the shell 160 may be a portion or a part of the housing 2 of the hearing device 100. The dome 8 may be mounted onto the shell 160 of the hearing device 100. FIG. 3 also shows a nozzle insert 170 arranged inside the shell 160. The nozzle insert 170 may be used to make the connection from the sound path component 30 to the ear of the user. The nozzle insert 170 may facilitate using a radial first sealing unit 130 and/or a radial second sealing unit 140. The nozzle insert 170 may facilitate cleaning of the hearing device 100. The nozzle insert 170 may collect e.g. the ear wax and may have an exchangeable filter part to be exchanged when desired. The nozzle insert 170 may have different configurations.

Figure 4:
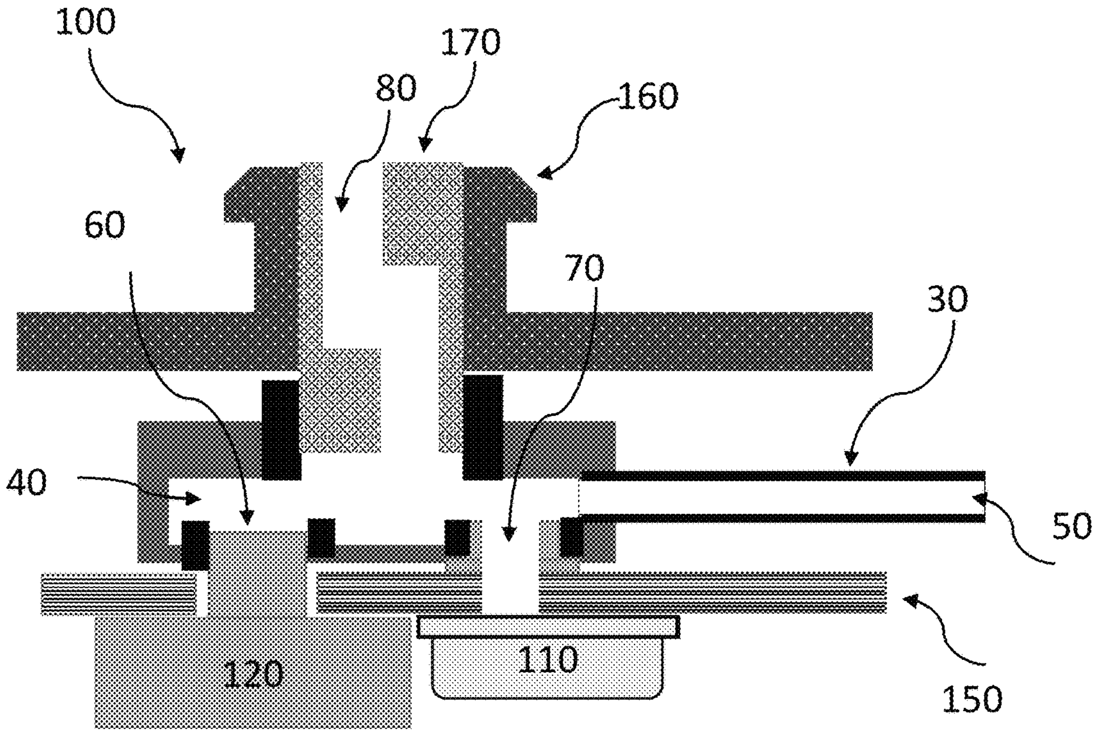

FIG. 4 shows a cross-sectional side view of a cut through of a part of another exemplary hearing device 100 comprising a sound path component 30. The reference signs shown in FIG. 4 at least partly correspond to those as shown in FIG. 3 and described above in connection with FIG. 3. In FIG. 4, both the input transducer 110 and the output transducer 120 are arranged on the PCB 150 through two respective holes on the PCB 150. FIG. 4 also shows a sound path component 30 made of dark and light parts. In FIG. 4, the darker parts of the sound path component 30 are made of a flexible e.g. a soft material. Examples of the flexible material e.g. the soft material may comprise silicon or Thermoplastic Elastomer (TPE). In FIG. 4, the darker parts of the sound path component 30 around the output transducer opening 60 and the input transducer opening 70 may act respectively as the first sealing unit 130 and the second sealing unit 140. In FIG. 4, the first sealing unit 130 and the second sealing unit 140 are radial sealing units.

In FIG. 4, the lighter parts of the sound path component 30 are made of a non-flexible e.g. a hard material. Examples of the non-flexible material e.g. the hard material may comprise hard plastics such as ABS. FIG. 4 also shows that a nozzle insert 170 has a different configuration, compared to the nozzle insert 170 of FIG. 3.

Figure 5:
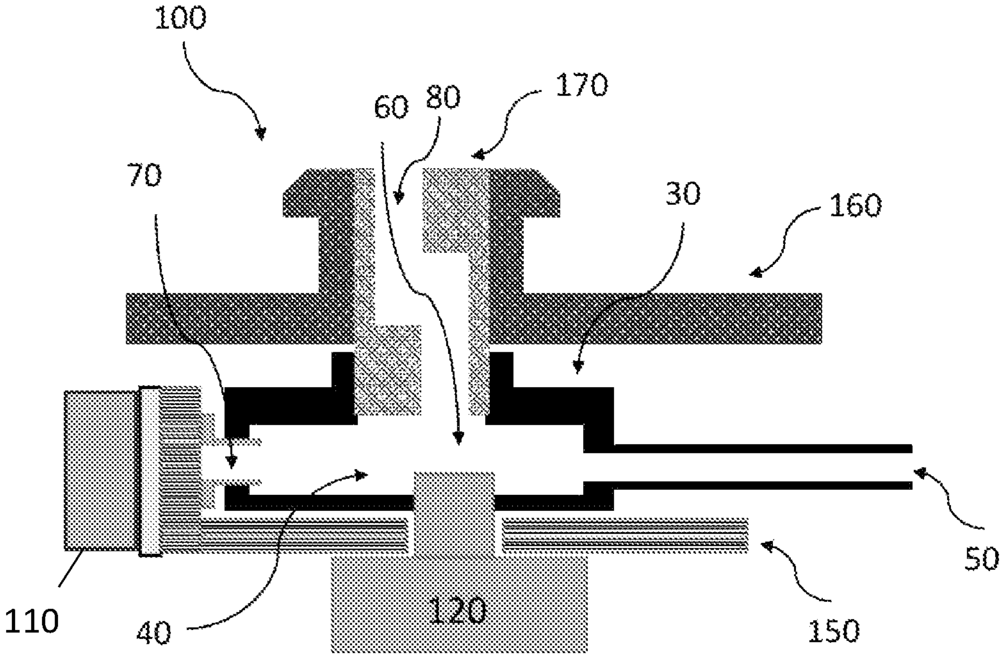
Figure 6:
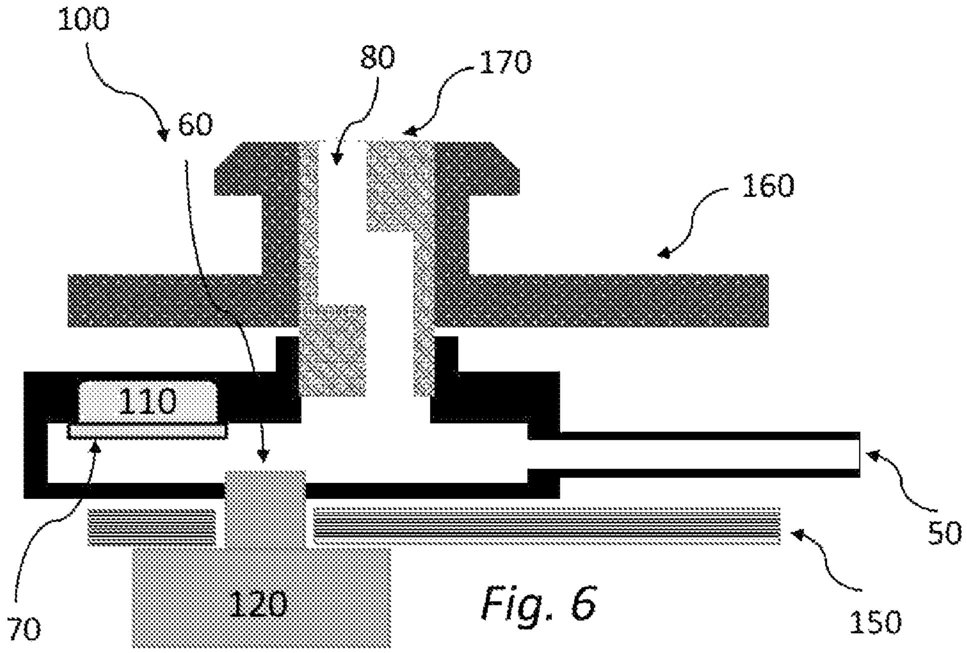

FIGS. 5 and 6 show cross-sectional side views of a cut through of a part of two other exemplary hearing device 100 comprising a sound path component 30. The reference signs shown in FIGS. 5 and 6 at least partly correspond to those as shown in FIG. 3 and described above in connection with FIG. 3. The chamber 40 of the sound path component 30 may have a number of sides. FIG. 5 shows that an output transducer opening 60 is arranged at a first side of the chamber 40. FIG. 5 shows that an output transducer opening 60 is arranged at a lower side of the chamber 40. FIG. 5 shows that an input transducer opening 70 is arranged at a second side of the chamber 40. In FIG. 5, the input transducer opening 70 at a left side of the chamber 40.

FIG. 6 shows that an output transducer opening 60 is arranged at a first side of the chamber 40. FIG. 6 shows that an output transducer opening 60 is arranged at a lower side of the chamber 40. FIG. 6 shows that an input transducer opening 70 is arranged at a second side of the chamber 40. In FIG. 6, the input transducer opening 70 is arranged at an upper side of the chamber 40, which is opposite to the first side. FIG. 6 shows that the input transducer opening 70 is arranged in a pocket at the upper side of the chamber 40.

Figure 7:
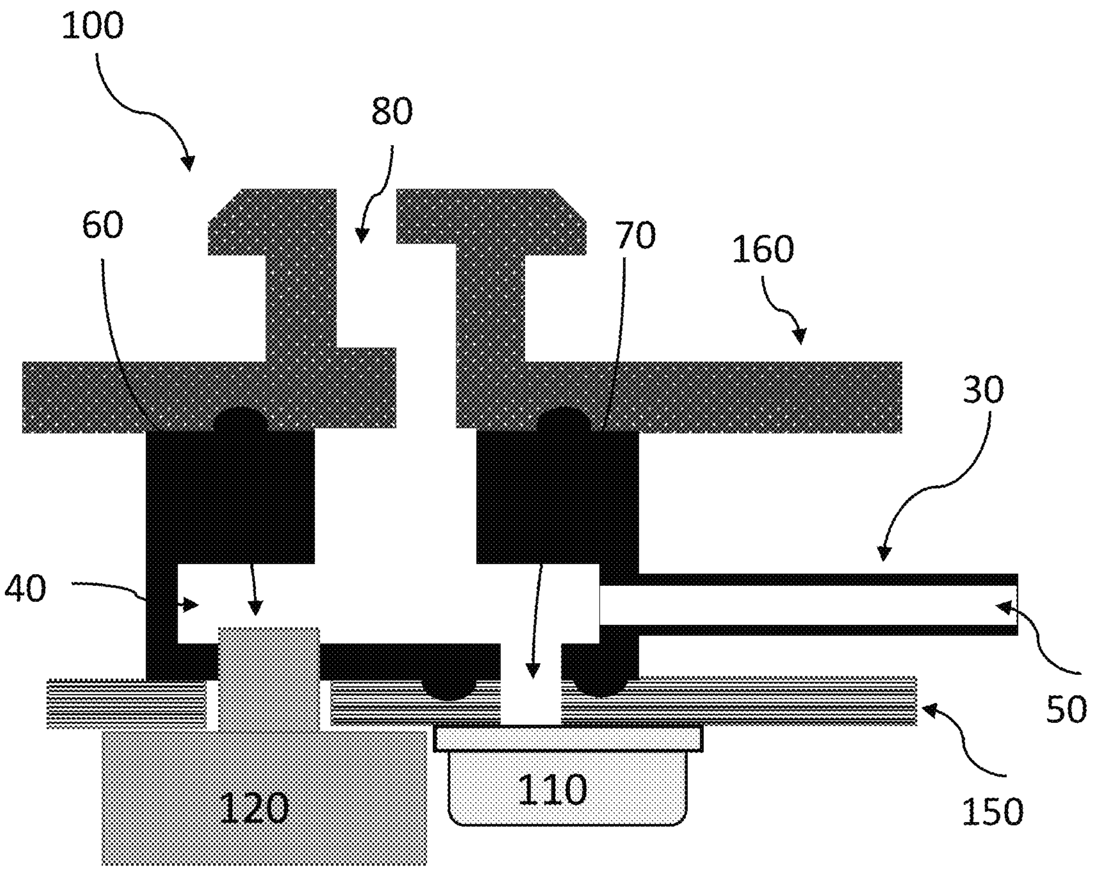

FIG. 7 shows a cross-sectional side view of a cut through of a part of yet another exemplary hearing device 100 comprising a sound path component 30. The reference signs shown in FIG. 7 at least partly correspond to those as shown in FIG. 3 and described above in connection with FIG. 3. In FIG. 7, the output transducer opening 60 and the input transducer opening 70 are arranged at a first side of the chamber 40 i.e. at the same side of the chamber 40. In FIG. 7, the sound path component is made of a flexible material. In FIG. 7 portions of the sound path component 30 around the output transducer opening 60 and the input transducer opening 70 act respectively as the first sealing unit 130 and the second sealing unit 140. In FIG. 7, the first sealing unit 130 and the second sealing unit 140 act as axial sealing units. In FIG. 7 half circular bumps arranged around the input transducer opening 70 and in between the sound path component 30, the PCB 150 and the shell 160 provide axial sealing units.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A hearing device (100) configured to be arranged in an ear of a user, the hearing device (100) comprising a sound path component (30), the sound path component (30) comprising:
   - a chamber (40) arranged at a first end of the hearing device (10),
   - a vent channel (50) configured to vent the hearing device (100), the vent channel (50) extending from the chamber (40) to a second end of the hearing device (20), the vent channel (50) having a first vent end at the chamber and a second vent end at the second end of the hearing device (20),
   - an output transducer opening (60) configured to be connected to an output transducer (120), the output transducer opening (60) being arranged at the chamber (40),
   - a first opening (80) arranged at the chamber (40) and being configured to point towards an ear canal of the user, when the user is wearing the hearing device (100) in its intended position in the ear, and
   - a second opening (90) arranged at the second end of the hearing device (20) and being configured to point towards surrounding of the user, when the user is wearing the hearing device (100) in its intended position in the ear, the second opening (90) being at the second vent end of the vent channel (50), wherein the chamber (40), the vent channel (50), the output transducer opening (60), the first opening (80) and the second opening (90) are in fluid connection with one another.

2. The hearing device (100) according to item 1, wherein the sound path component (30) further comprises an input transducer opening (70) configured to be connected to a first input transducer (110), the input transducer opening (70) being arranged at the chamber (40), and wherein the input transducer opening (70) is in fluid connection with the chamber (40), the vent channel (50), the output transducer opening (60), the first opening (80) and the second opening (90).

3. The hearing device (100) according to item 1 or 2, wherein the chamber (40) has a number of sides, and wherein the output transducer opening (60) is arranged at a first side of the chamber (40), and wherein the input transducer opening (70) is arranged at a second side of the chamber (40).

4. The hearing device (100) according to item 1 or 2, wherein the chamber (40) has a number of sides, and wherein the output transducer opening (60) and the input transducer opening (70) are arranged at a first side of the chamber (40).

5. The hearing device (100) according to any of the preceding items, wherein the sound path component (30) is a one-part component.

6. The hearing device (100) according to any of the preceding items, wherein the sound path component (30) is replacable in the hearing device (100).

7. The hearing device (100) according to any of the preceding items, wherein at least a portion of the sound path component (30) is made of a flexible material.

8. The hearing device (100) according to any of the preceding items, wherein the hearing device (100) comprises a first sealing unit (130) for the output transducer opening (60) and a second sealing unit (140) for the input transducer opening (70), and wherein the first sealing unit (130) and the second sealing unit (140) are configured to respectively seal the output transducer opening (60) and the input transducer opening (70).

9. The hearing device (100) according to any of the preceding items, wherein the hearing device (100) comprises a dome at the first opening (80).

10. The hearing device (100) according to any of the preceding items, wherein a dimension of the chamber (40) along a first direction is in the range of 2-10 mm and wherein a dimension of the chamber (40) along a second direction is in the range of 2-10 mm.

LIST OF REFERENCES

100 Hearing device
2 Housing
4 Push button
6 Air gap
8 Dome
10 First end of the hearing device
12 First surface
14 Exterior surface
16 Interior surface
18 Electrical contact
20 Second end of the hearing device 30 Sound path component
40 Chamber
50 Vent channel
60 Output transducer opening
70 Input transducer opening
80 First opening
90 Second opening
110 Input transducer
120 Output transducer
130 First sealing unit
140 Second sealing unit
150 Printed circuit board
160 Shell
170 Nozzle insert

The invention claimed is:

1. A hearing device configured to be arranged in an ear of a user, the hearing device comprising a sound path component, the sound path component comprising:

a chamber at a first end of the hearing device;

a vent channel extending from the chamber to a second end of the hearing device, the vent channel having a first vent end at the chamber and a second vent end at the second end of the hearing device;

an output transducer opening at the chamber, the output transducer opening configured to couple to an output transducer;

a first opening at the chamber and being configured to face towards an ear canal of the user, when the user is wearing the hearing device in an intended position; and a second opening at the second end of the hearing device and being configured to face towards a surrounding of the user, when the user is wearing the hearing device in the intended position, the second opening being at the second vent end of the vent channel; and an input transducer opening at the chamber and being configured to couple to a first input transducer;

wherein the vent channel, the input transducer opening, the output transducer opening, the first opening and the second opening are in fluid connection with each another.

2. The hearing device according to claim 1, wherein the output transducer opening is at a first side of the chamber.

3. The hearing device according to claim 2, wherein the input transducer opening is at a second side of the chamber.

4. The hearing device according to claim 1, wherein the output transducer opening and the input transducer opening are at a first side of the chamber.

5. The hearing device according to claim 1, wherein the sound path component is a one-part component.

6. The hearing device according to claim 1, wherein at least a portion of the sound path component is made of a flexible material.

7. The hearing device according to claim 1, further comprising a first sealing unit configured to seal the output transducer opening.

8. The hearing device according to claim 7, further comprising a second sealing unit configured to seal the input transducer opening.

9. The hearing device according to claim 1, further comprising a dome at the first opening.

10. The hearing device according to claim 1, wherein a first dimension of the chamber along a first direction is anywhere between 2-10 mm.

11. The hearing device according to claim 10, wherein a second dimension of the chamber along a second direction is anywhere between 2-10 mm.

12. The hearing device according to claim 1, wherein the input transducer opening, the output transducer opening, and the first opening are in fluid connection with each other via the chamber.

13. The hearing device according to claim 12, wherein the vent channel is in fluid connection with the input transducer opening, the output transducer opening, and the first opening, via the chamber.

14. The hearing device according to claim 1, wherein the vent channel is configured to vent the hearing device.

15. A hearing device configured to be arranged in an ear of a user, the hearing device comprising a sound path component, the sound path component comprising:

a chamber at a first end of the hearing device;

a vent channel extending from the chamber to a second end of the hearing device, the vent channel having a first vent end at the chamber and a second vent end at the second end of the hearing device;

an output transducer opening at the chamber, the output transducer opening configured to couple to an output transducer;

a first opening at the chamber and being configured to face towards an ear canal of the user, when the user is wearing the hearing device in an intended position; and a second opening at the second end of the hearing device and being configured to face towards a surrounding of the user, when the user is wearing the hearing device in the intended position, the second opening being at the second vent end of the vent channel; and an input transducer opening at the chamber and being configured to couple to a first input transducer;

wherein the vent channel, the input transducer opening, the output transducer opening, the first opening and the second opening are in fluid connection with each another; and wherein the sound path component is replaceable in the hearing device.

* * * * *